United States Patent

Fatemi-Booshehri et al.

[11] Patent Number: 5,991,239
[45] Date of Patent: Nov. 23, 1999

[54] CONFOCAL ACOUSTIC FORCE GENERATOR

[75] Inventors: Mostafa Fatemi-Booshehri; James F. Greenleaf, both of Rochester, Minn.

[73] Assignee: Mayo Foundation for Medical Education and Research, Rochester, Minn.

[21] Appl. No.: 08/990,469

[22] Filed: Dec. 15, 1997

Related U.S. Application Data

[63] Continuation-in-part of application No. 08/758,879, Dec. 2, 1996
[60] Provisional application No. 60/017,058, May 8, 1996.

[51] Int. Cl.[6] .................................................. H04R 17/00
[52] U.S. Cl. ......................... 367/164; 310/320; 310/334
[58] Field of Search ........................... 367/164; 600/447, 600/459; 310/320, 334, 369

[56] References Cited

U.S. PATENT DOCUMENTS

| | | | |
|---|---|---|---|
| 4,154,113 | 5/1979 | Engler | 73/626 |
| 4,155,258 | 5/1979 | Engler | 128/626 |
| 4,155,259 | 5/1979 | Engler | 73/626 |
| 4,155,260 | 5/1979 | Engler | 73/626 |
| 4,180,790 | 12/1979 | Thomas | 367/7 |
| 4,217,684 | 8/1980 | Brisken | 29/25.35 |
| 4,425,525 | 1/1984 | Smith | 310/336 |
| 4,441,503 | 4/1984 | O'Donnell | 128/660 |
| 4,470,303 | 9/1984 | O'Donnell | 73/602 |
| 4,470,305 | 9/1984 | O'Donnell | 73/626 |
| 4,569,231 | 2/1986 | Carnes | 73/626 |
| 4,662,223 | 5/1987 | Riley | 367/103 |
| 4,669,314 | 6/1987 | Magrane | 73/610 |
| 4,809,184 | 2/1989 | O'Donnell | 364/413.25 |
| 5,081,995 | 1/1992 | Lu | 128/662.03 |
| 5,402,393 | 3/1995 | Konrad | 367/89 |
| 5,492,121 | 2/1996 | Lu | 128/653.1 |

*Primary Examiner*—Ian J. Lobo
*Attorney, Agent, or Firm*—Quarles & Brady, LLP

[57] ABSTRACT

An acoustic transducer has two separate elements which are driven by separate signal generators to produce two acoustic beams that focus at the same target location. The two acoustic beams interact at the target location to produce a beat force. The target location is moved to scan a subject by mechanically moving the acoustic transducer, or the two intersecting acoustic beams can be steered electronically to move the target location.

10 Claims, 5 Drawing Sheets

CONFOCAL ACOUSTIC FORCE GENERATOR

RELATED APPLICATION

This is a continuation-in-part of U.S. patent application Ser. No. 08/758,879 filed on Dec. 2, 1996, which in turn in based on U.S. Provisional Application Ser. No. 60/017,058 filed on May 8, 1996.

BACKGROUND OF THE INVENTION

The field of the invention is the detection and imaging of objects using acoustic beams.

In the field of medical imaging there are a number of modes in which ultrasound can be used to produce images of objects within a patient. The ultrasound transmitter may be placed on one side of the object and the sound transmitted through the object to the ultrasound receiver placed on the other side ("transmission" mode). With transmission mode methods, an image may be produced in which the brightness of each image pixel is a function of the amplitude of the ultrasound that reaches the receiver ("attenuation mode"), or the brightness of each pixel is a function of the time required for the sound to reach the receiver ("time-of-flight" or "speed of sound" mode). In the alternative, the receiver may be positioned on the same side of the object as the transmitter and an image may be produced in which the brightness of each pixel is a function of the amplitude of the ultrasound reflected from the object back to the receiver ("reflection", "backscatter" or "echo" mode). In another mode of operation ("Doppler" mode) the movement of the object is detected and imaged by measuring the phase of the ultrasound reflected from the object back to the receiver. In all of these medical imaging applications ultrasonic waves are transmitted and ultrasonic waves are received. The higher sonic frequencies enable precise beams to be formed in both the transmit and receive modes.

Ultrasonic transducers for medical applications are constructed from one or more piezoelectric elements sandwiched between a pair of electrodes. Such piezoelectric elements are typically constructed of lead zirconate titanate (PZT), polyvinylidene diflouride (PVDF), or PZT ceramic/polymer composite. The electrodes are connected to a voltage source, and when a voltage waveform is applied, the piezoelectric elements change in size at a frequency corresponding to that of the applied voltage. When a voltage waveform is applied, the piezoelectric elements emits an ultrasonic wave into the media to which it is coupled at the frequencies contained in the excitation waveform. Conversely, when an ultrasonic wave strikes the piezoelectric element, the element produces a corresponding voltage across its electrodes. A number of such ultrasonic transducer constructions are disclosed in U.S. Pat. Nos. 4,217,684; 4,425,525; 4,441,503; 4,470,305 and 4,569,231.

When used for ultrasonic imaging, the transducer typically has a number of piezoelectric elements arranged in an array and driven with separate voltages (apodizing). By controlling the time delay (or phase) and amplitude of the applied voltages, the ultrasonic waves produced by the piezoelectric elements (transmission mode) combine to produce a net ultrasonic wave that travels along a preferred beam direction and is focused at a selected point along the beam. By controlling the time delay and amplitude of the applied voltages, the beam with its focal point can be moved in a plane to scan the subject. A number of such ultrasonic imaging systems are described in U.S. Pat. Nos. 4,155,258; 4,155,260; 4,154,113; 4,155,259; 4,180,790; 4,470,303; 4,662,223; 4,669,314; 4,809,184; 5,081,995 and 5,492,121.

The acoustic radiation force exerted by an acoustic wave on an object in its path is a universal phenomenon common to all forms of radiated energy. When a beam of light is absorbed or reflected by a surface, a small force is exerted on that surface. The same is true for electromagnetic waves, transverse waves on an elastic string, and surface waves on a liquid. This force is produced by a "radiated pressure" and a complete disclosure of this phenomenon is set forth by G.R. Torr, "The Acoustic Radiation Force", *Am. J. Phys.* 52(5), May 1984.

It is generally accepted that the radiation force F exerted on a totally absorbing target by an ultrasonic beam of power P is given by the equation $$F=P/c_1$$

where c is the speed of sound in the medium surrounding the target. For normal incidence on a plane reflecting surface the radiation force has twice this value. The speed of sound in water is 1500m/s, thus the radiation force on an absorbing target in water is about $6.67 \times 10^{-4}$ newtons/watt.

This sonic radiation force has found application in medicine in the field of extracorporeal shock wave lithotripsy. By applying a set of powerful acoustic shock waves at the surface of the patient such that their energies focus on a target inside the patient, objects such as renal or gall-stones can be fragmented. Such lithotripsy systems are described, for example, in Goldstein, A., "Sources of Ultrasonic Exposure," *Ultrasonic Exposimetry*, eds. M. C. Ziskin and P. A. Lewin, CRC Press, Boca Raton, 1993.

Another application which employs an ultrasonic radiation force produced by a transducer is disclosed by Sugimoto et al, "Tissue Hardness Measurement Using The Radiation Force Of Focused Ultrasound", *IEEE Ultrasonics Symposium*, pp. 1377–80, 1990. In this experiment, a pulse of focused ultrasonic radiation is applied to deform the object which is positioned at the focal point of the transducer.

SUMMARY OF THE INVENTION

The present invention is a transducer for producing an acoustic radiation force at a target location by directing multiple high frequency sound beams to intersect at the location. The high frequency sound beams may differ in frequency and the radiation force will vary in amplitude at this difference, or "beat" frequency. In the alternative, one of the high frequency sound beams may be amplitude modulated at a lower, baseband frequency and the radiation force will vary in amplitude at this baseband frequency.

A general object of the invention is to provide a single transducer which produces two sonic beams that focus at a target location. In its simplest form the confocal transducer has a first element which is shaped to focus a sonic beam at a target location and a second element which is disposed around the first element and is shaped to focus a second sonic beam at the same target location. When the confocal transducer is turned, or translated, both focal points move together to scan the target location over a subject.

Another object of the invention is to provide a single transducer which produces two sonic beams that focus at the same target location and the transducer can be driven to electronically scan the target location over a subject. Rather than physically moving the transducer to scan the subject, each transducer element can be formed as separately controlled sub-elements. By controlling the time delay (or phase) and amplitude of the voltages applied to these sub-elements, the sonic beams produced by them can be focused at the same target location and that location can be moved to scan the subject.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Consider an ultrasonic source directing its beam on a large target in water. The radiation force, F, for the plane wave case is commonly written as $$F=KP/c, \quad (1)$$

where P, c, and K are the total time averaged acoustic power, sound speed in water, and a constant, respectively. The value of K for a perfectly absorbing target is 1, and for a perfectly reflecting target it is 2. For a focused beam impinging on a partially reflecting target of arbitrary size, the linear relation of (1) still holds, however, the value of K is different and can be determined as a function of target power reflection coefficient and its size as described by J.Wu, "Calculation of Acoustic Radiation Force Generated by Focused Beams Using the Ray Acoustic Approach," *J. Acoust. Soc. Am.* 97(5), pt. 1, May 1995.

Figure 1:
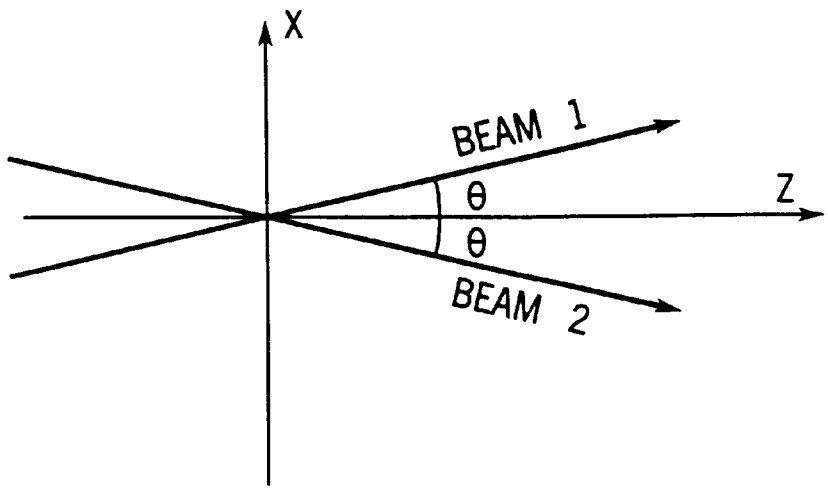
FIG. 1 is a graphic representation of two intersecting sonic beams.

Consider two plane wave beams propagating in two directions on the (x,z) plane, crossing each other at the origin as shown in FIG. 1. To simplify the problem, we assume that these beams have equal amplitude and phase, and propagate at $\theta$ and $-\theta$ angles with respect to the z-axis. Also, we assume that both profiles on the z=0 plane are identical and equal to g(x,y). The resultant field on the z=0 plane may be written as $$s(t)=g(x,y)[\cos(\omega_1 t - k_1 x\sin\theta)+\cos(\omega_2 t + k_2 x\sin\theta)], \quad (2)$$

where $k_1=\omega_1/c$ and $k_2=\omega_2/c$. Assuming $\Delta\omega=\omega_1-\omega_2<<\omega_1,\omega_2$, then it can be shown that the acoustic power has slow variations at the "beat" frequency $\Delta\omega$ about its long time average. Denoting this beat frequency component by $P_1(t,x,y)$, we can write $$P_1(t,x,y)=g^2(x,y)\cos[\Delta\omega t-(k_1+k_2)x\sin\theta]. \quad (3)$$

Now consider a planar target on the z=0 plane. Referring to Eq. (1), the normal component of radiation force exerted on this target by $P_1(t,x,y)$ may be found by the following integration:

$$F_1(t)=K/C\int\int P_1(t,x,y)dxdy.+tm \quad (4)$$

The result of this integration is a sinusoidal function of time at the beat frequency $\Delta\omega$. This beat force vibrates the target, resulting in a new pressure field at this frequency, which can be received. The received signal r(t), may be written as $$r(t)=k'\cos(\Delta\omega t+\psi), \quad (5)$$

where k' and $\psi$ are constants whose values depend on size, power reflection coefficient, and the other mechanical parameters of the target, such as mass and damping factor, that determine its response to a given force at a particular frequency. In addition to the above, these constants are functions of receiver parameters.

Figure 2:
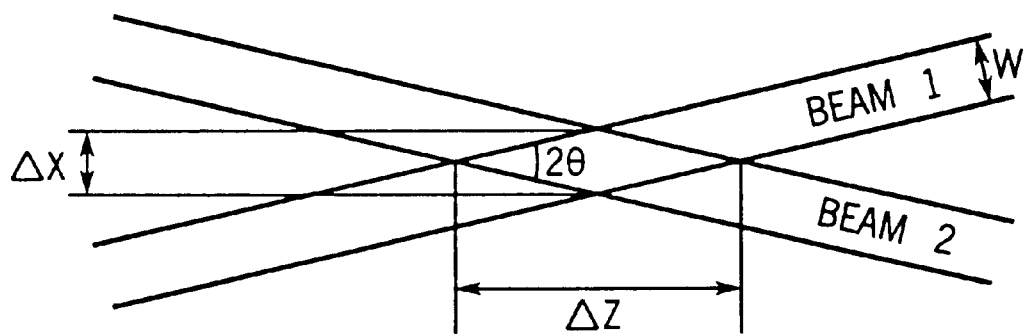
FIG. 2 is a graphic representation of the region in which the beat signal is produced by the intersecting sonic beams illustrated in FIG. 1.

Referring particularly to FIG. 2, a two-element transducer assembly is employed that produces two focused beams of beamwidth w that intersect about their focal points at an angle $2\theta$. The above plane wave approximation applies because the interaction region is limited to the focal area. The resolution of the system may be defined as the interaction area where the two beams overlap. In this example, $\Delta x$ and $\Delta z$ represent the lateral and axial resolutions, respectively. Assuming identical beamwidths, w, the resolution can be written $\Delta x=\omega/\cos\theta$, and $\Delta z=\omega/\sin\theta$. These values are full-width at quarter-maximum (FWQM) estimates because w is defined on a full-width at half-maximum (FWHM) basis.

Within the interaction area the beat force indicated by Eq. (4) will be applied to the object. The manner in which the object responds to this force will, of course, depend on its mechanical characteristics. As the systems described below will indicate, there are many uses for this discovery which stem from its ability to accurately project a low frequency acoustic force to a defined area.

The present invention is an acoustic transducer specifically designed to exploit this discovery. The transducer has two separate elements which can be separately driven to produce the two sonic beams that intersect about their focal points to generate the beat force. The transducer can be shaped to focus the two beams it produces at a target location and this target location can be moved to any point by physically moving the transducer. In the alternative, each transducer element may be formed by an array of subelements which are separately driven to electronically focus and move the target location of the two intersecting beams.

Description Of The Preferred Embodiment

Figure 3:
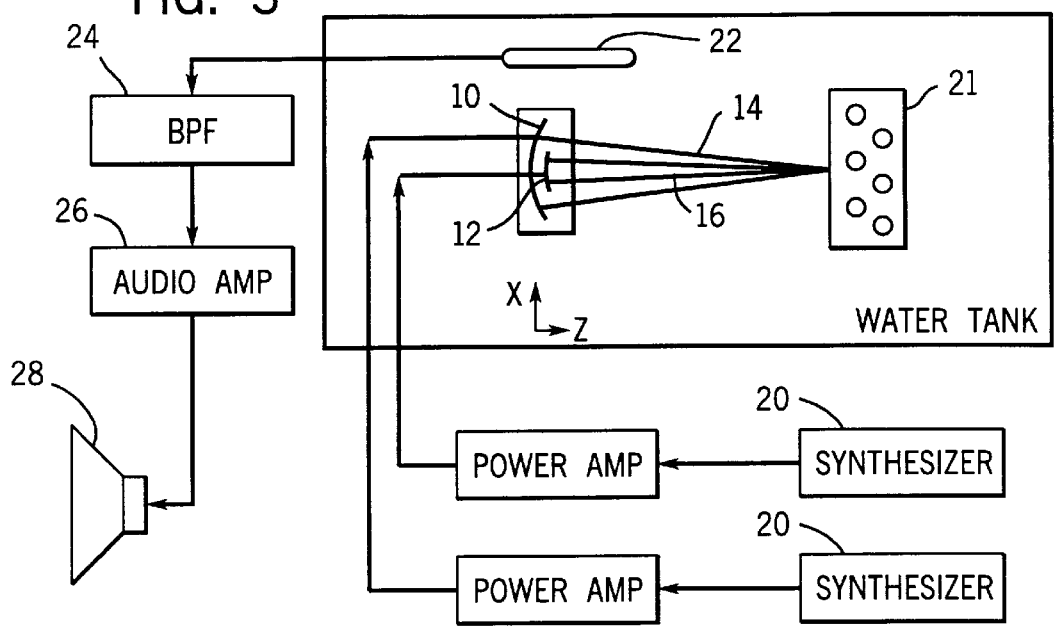
FIG. 3 is a block diagram of a first system used to detect the presence of an object.

Referring particularly to FIG. 3, a first system is used to detect the presence of an object based upon the acoustic wave produced by the object in response to the applied beat force. This detector system includes an ultrasonic transducer having two elements 10 and 12 which produce two focused beams 14 and 16 of beamwidth w=2 mm that cross each other at their focal points. The elements 10 and 12 are driven by respective continuous wave synthesizers 18 and 20 at ultrasonic frequencies $\omega_1$ and $\omega_2$ that differ by a beat frequency $\Delta\omega=2\pi\times6,475$ rad./sec.

The acoustic field produced by the object 21 in response to the beat force produced by the intersecting beams 14 and 16 is received by a hydrophone 22. The received beat signal is applied through a band-pass filter 24 to an audio amplifier 26. The band-pass filter 24 has a narrow pass band centered on the beat frequency $\Delta\omega$ to reject noise and any reflected ultrasonic signals. The amplified audio signal may be applied to a loudspeaker 28 or an earphone to provide the operator with an indication of the amplitude of the acoustic wave produced by the object.

A second application of the invention is an imaging system. Rather than relying on the reflection or attenuation of an ultrasonic wave by the object as is done in ultrasound imagers, the imager of FIG. 4 relies on other mechanical properties of the object. More specifically, the imager exploits the ability of the object to convert the beat force to an acoustic wave that can be detected by the receiver.

Figure 4:
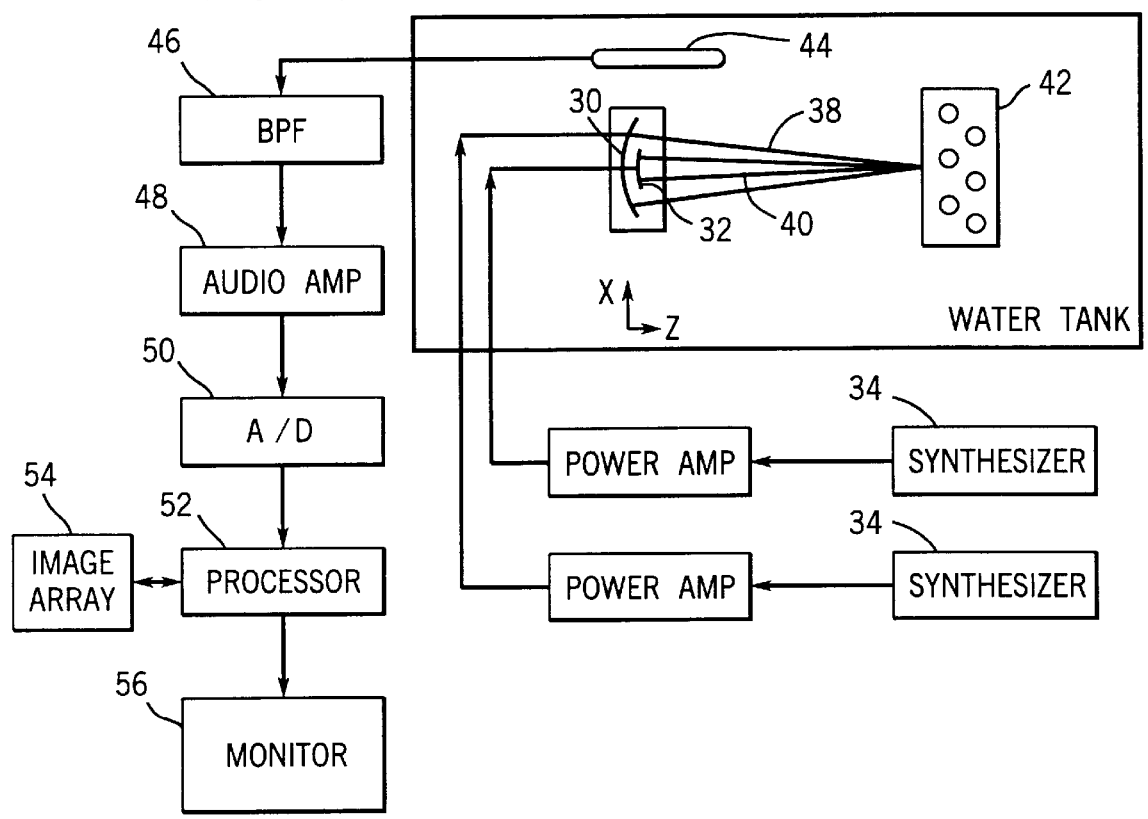
FIG. 4 is a block diagram of a second system used to image an object.

Referring particularly to FIG. 4, the imaging system includes a transducer having two elements 30 and 32 that produce beams 38 and 40. The beams 38 and 40 cross each other at their focal points. The element 30 is driven by a continuous wave, signal synthesizer 34 at a frequency of $f_1$ and the element 32 is driven by an identical synthesizer 36 at a second frequency $f_2$. The resulting ultrasonic beams 38 and 40 thus produce a beat force in the target object 42 at a frequency $\Delta f=f_2-f_1$.

The sonic wave produced by the target object 42 is received by a hydrophone 44 and digitized. The received beat signal is filtered by a band-pass filter 46 centered on the beat frequency, amplified at audio amplifier 48 and digitized by a 12-bit analog-to-digital converter 50 at 100,000 samples/sec. The processor 52 calculates the mean amplitude (or the standard deviation) of 600 samples of the digitized beat signal, then stores this value in the image array 54 at a location corresponding to the beam intersection position. Processor 52 also controls other parts of the system to carry out the scan process. It directs the beams 38 and 40 such that their intersect region raster scans the object 42 in the x-z (or x-y) plane. Processor 52 also provides the trigger signals needed to synchronize the scanning and digitization function. The resulting beat signal image produced after a complete raster scan may be enhanced using known image enhancement methods and/or displayed on a monitor 56. A two-dimensional image is thus produced in which the gray scale intensity of each pixel indicates the acoustic level produced by the target 42 at the single beat frequency.

Figure 5:
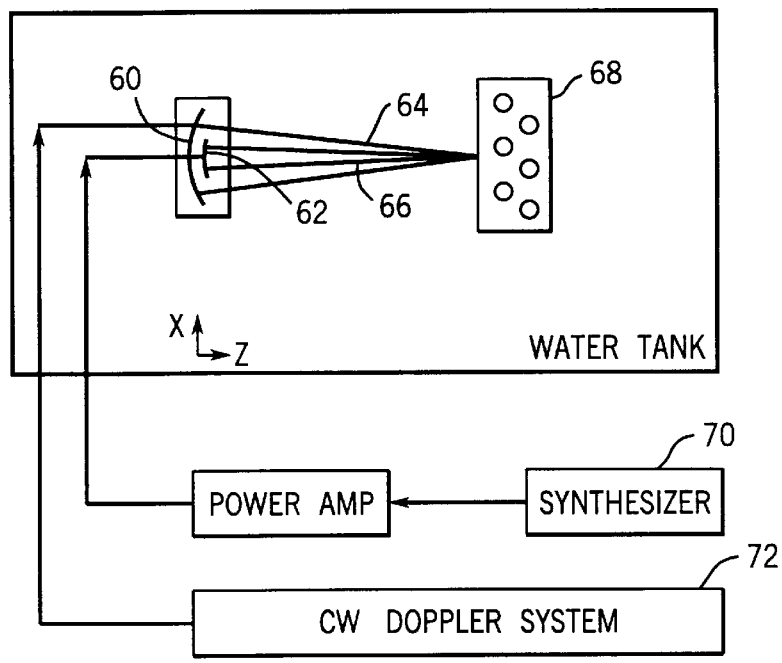
FIG. 5 is a block diagram of a third system used to measure the physical properties of an object.

A third system employs a Doppler receiver to sense the target vibration in response to the applied beat force. Referring particularly to FIG. 5, this system includes an ultrasonic transducer having two elements 60 and 62 that produce beams 64 and 66 at respective frequencies $\omega_1$ and $\omega_2$ which intersect at the target object 68. The beams 64 and 66 can be moved mechanically or electronically to scan their intersecting region over the object 68.

The transducer element 62 is driven by a continuous wave signal at $\omega_2$ produced by a synthesizer 70. On the other hand, the transducer 60 is driven at frequency $\omega_1$ by a CW Doppler system 72 which forms part of a commercially available ultrasound imaging system such as that commercially available from Acuson Company and sold as the Model # XP128P computed tomography system. The target object 68 is vibrated by the beat force at the difference frequency $\Delta\omega=\omega_1-\omega_2$, and this vibration is a movement which is detected by the receiver section of the Doppler system 72. As discussed previously, the object vibration, and hence its local velocity, is a function of its mechanical characteristics. Thus the Doppler system 72 is used as a tool for characterizing the target's mechanical properties.

One factor that must be considered in analyzing the Doppler system output, however, is that the frequency $\omega_2$ of the beam 66 is close enough to that ($\omega_1$) of the Doppler system 72 to be interpreted as a Doppler shifted echo signal. This "interfering" signal is at a stationary frequency $\omega_2$, however, and hence it can be readily distinguished from true Doppler shift echo signals which have a broad Doppler spectrum. The interfering signal at frequency $\omega_2$ can be filtered out of the Doppler response.

A fourth system which employs the dual element transducer serves an entirely different function than those described above. Rather than obtaining an indication of the presence or nature of a target object, in this system information is transferred to the target object in the form of acoustical energy. By using ultrasonic beams which can be finely focused and directed, this transfer of information can be precisely targeted.

If we consider two ultrasonic beams of frequency $\omega_0$ and one of the beams is amplitude modulated by a baseband signal f(t) at a modulation index m, equation (2) above for the resultant field is rewritten as follows:

$$s(t)=g(x,y)[\cos(\omega_0 t-k_0 x\sin\theta)+mf(t)\cos(\omega_0 t+k_0 x\sin\theta)] \quad (6)$$

where $k_0=\omega_0/c$, $|m|<1$ is a constant, and f(t) is the desired baseband signal whose bandwidth is much less than $\omega_0$. It can be shown that the acoustic power has slow variations about its long time average and that this produces a corresponding time-varying force. This time-varying force vibrates the target, resulting in a new pressure field that regenerates the baseband signal f(t). The regenerated audio signal, r(t), may be written as $$r(t)=K'mf(t), \quad (7)$$

where K' is a constant whose value depends on size, power reflection coefficient, and other mechanical properties of the target, such as mass and damping factor, that determine its response to a given force at a particular frequency.

Figure 6:
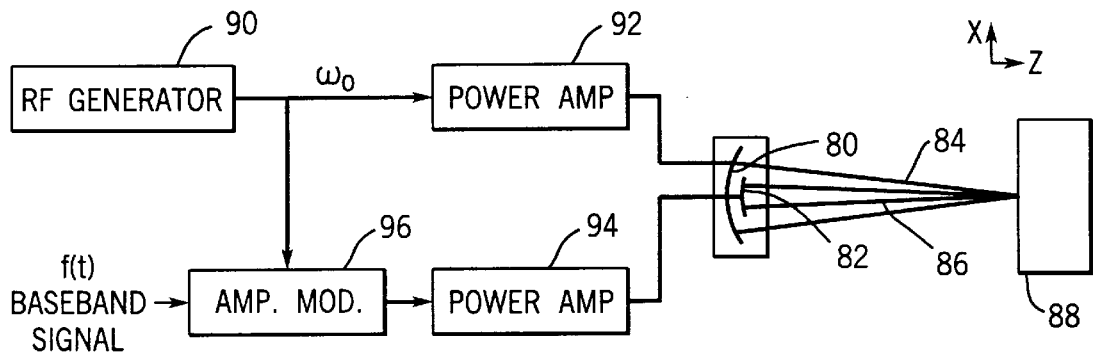
FIG. 6 is a block diagram of a fourth system used to convey a signal acoustically to a distant target object.

Referring particularly to FIG. 6, the audio regeneration system employs an ultrasound transducer having two separate elements 80 and 82 that produce respective beams 84 and 86 that intersect at a target object 88. They have a focal length and a beamwidth (defined as the full-width at half-maximum), positioned on the horizontal plane. The beams 84 and 86 intersect at about their focal points. Both elements 80 and 82 are driven by a common RF generator 90 at a carrier frequency $\omega_0$. The continuous wave driven signal is applied through a power amplifier 92 directly to the transducer element 80, whereas the transducer element 82 is driven through a power amplifier 94 and an amplitude modulator 96. The baseband signal f(t) is input to the modulator 96 and it functions to modulate the amplitude of the high frequency carrier signal $\omega_0$ that drives the transducer element 82.

The two ultrasonic beams 84 and 86 interact at their intersection in the target object 88. This interaction causes the target object 88 to vibrate in response to the baseband signal f(t). The beams 84 and 86 can be made very directive using small transducer elements 80 and 82, because the wavelength of the ultrasound beams at frequency $\omega_0$ is very small compared to that of the baseband signal f(t). The target 88 acts as the converter of the high frequency ultrasound energy to the baseband frequency energy and the frequency response can be made very flat because the bandwidth of the baseband signal f(t) is very small relative to the ultrasound frequency $\omega_0$.

Figure 7:
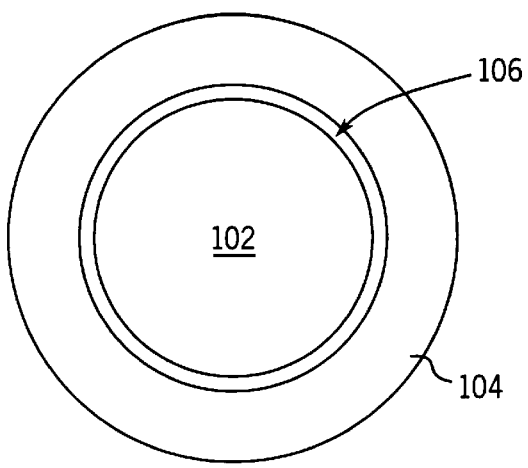
FIG. 7 is a back elevation view of a preferred embodiment of the transducer used in the systems of FIGS. 3–6.
Figure 8:
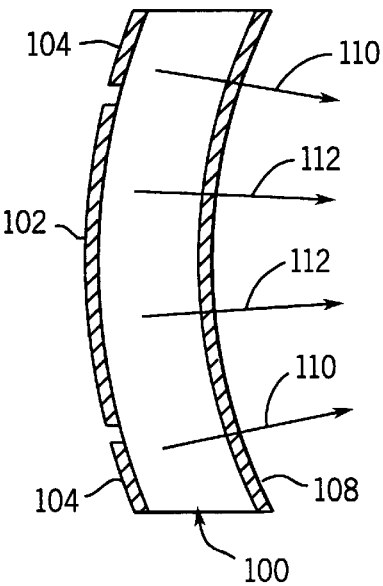
FIG. 8 is a side view in cross-section of the transducer of FIG. 7.

Referring particularly to FIGS. 7 and 8, a first preferred embodiment of the transducer used in the above applications includes a piezoelectric base 100 formed from a piezoelectric material such as lead zirconate titanate which is well known in the art as "PZT". The piezoelectric base 100 has a circular perimeter and a thickness which is determined by the speed of sound in the piezoelectric material and the desired center frequency of the emitted ultrasound. In the first preferred embodiment the piezoelectric 100 has a thickness of about 0.7 mm and a diameter of 22.5 mm.

Disposed on the back surface of the piezoelectric base 100 are two active electrodes 102 and 104. The electrode 102 is a conductive metal layer which is circular in shape and has a radius of 14.88 mm. The second active electrode 104 is also a conductive metal layer and it is annular in shape and disposed concentrically around the center electrode 102. It extends radially inward from the 22.5 mm boundary of the piezoelectric base 100 to a radius of 16.88 mm, thus leaving a 2 mm gap 106 between the two active electrodes 102 and 104. A single ground electrode 108 is formed over the entire front surface of the piezoelectric base 100 and the entire structure is concave in shape to focus the two ultrasonic beams indicated by arrows 110 and 112 at a focal point located a distance of 70 mm from the electrodes 102 and 104.

The two active electrodes 102 and 104 are separately driven and form, along with the piezoelectric base 100 and ground electrode 108, two separate transducer elements. A lead wire (not shown) connects each active electrode 102 and 104 to a separate power amplifier as described above, and a similar lead wire connects the common ground electrode to both power amplifiers. These two separate transducer elements produce the two beams 110 and 112 which share the same focal point. This common focal point can be moved, or scanned, by physically moving the structure to point its front surface at the subject. The beat force produced at the common focal point as described above, can thus be scanned over a subject by physically moving this single, confocal structure.

The particular dimensions used to construct this confocal transducer can be varied depending on the particular application. In general, it is desirable to dimension each active electrode 102 and 104 such that their areas are the same. This will enable acoustic beams 110 and 112 of equal energy to be produced with equal input voltages applied to each active electrode 102 and 104. In the alternative, the voltages applied to each active electrode 102 and 104 can be adjusted to compensate for any unequal area. The width of the gap 106 can also be adjusted. In general, the gap 106 should be wide enough to reduce the coupling that occurs between the two transducer elements in the common piezoelectric base 100 to acceptable levels. To achieve higher lateral resolution, the radius of the transducer is increased, and in order to achieve a higher depth resolution, the width of gap 106 is increased to decrease the depth of the region in which the two beams 110 and 112 interact. The focal length of the transducer and its frequency are determined by the particular application. The ultrasound frequency of the driving signals is determined considering the required spatial resolution, depth of penetration, and the difference (beat) frequency. A higher ultrasound frequency will allow for higher spatial resolution for a given aperture size. It also allows a larger difference frequency given the same relative bandwidth. However, in the case of biologic tissues, the attenuation of the medium increases rapidly with frequency, hence the penetration depth will be reduced with increased frequency. The total ultrasonic power of the transducer element is determined by the allowable limit for the application and the required signal to noise ratio of the resulting acoustic emission field.

Figure 9:
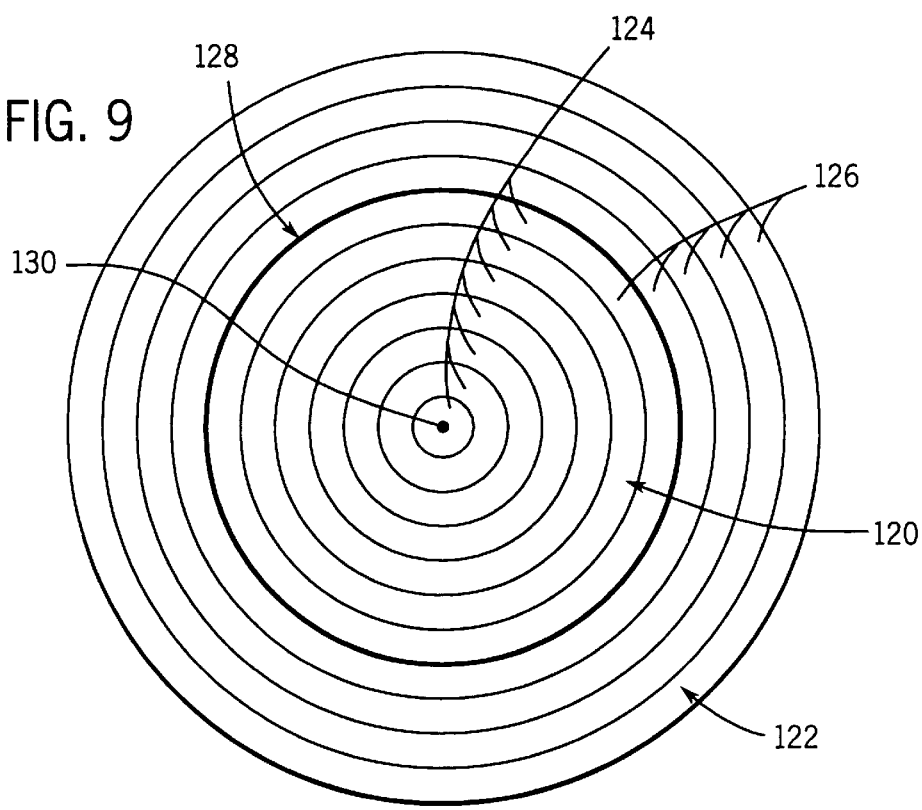
FIG. 9 is a back view of an alternative embodiment of the transducer.

An alternative embodiment of the ultrasonic transducer which enables the common focal point to be electrically scanned is shown in FIG. 9. It is similar to the first embodiment except it is not concave shaped, and the two active electrodes 120 and 122 on its back surface are each formed as a set of annular shaped sub-electrodes. More specifically, the first active electrode 120 is formed by a set of seven sub-electrodes 124 arranged concentrically around the center of the transducer. Similarly, the second active electrode 122 is formed by a set of four sub-electrodes 126 which are also arranged concentrically around the center of the transducer and radially outward from the first active electrode 120. The two active electrodes 120 and 122 are separated by a 2 mm gap 128 and each of the sub-electrodes 124 and 126 are separated from one another by approximately 0.2 mm and electrically insulated from each other. A lead wire (not shown) connects to each subelectrode 124 so that they can be driven by a separate voltage from one set of power amplifiers. A lead wire also connects to each sub-electrode 126 so that they can be driven by a separate voltage from one of a second set of power amplifiers. The two sets of power amplifiers are driven at different frequencies to provide the desired beat frequency as discussed above.

The voltage applied to the sub-electrodes 124 are controlled in amplitude and phase to produce a first acoustic beam that focuses at a location along the central axis 130 that extends perpendicular from the surface of the transducer. Similarly, the sub-electrodes 126 are controlled in amplitude and phase to produce a second acoustic beam that focuses at the same location. The distance of this common focal point can be changed by altering the phase and amplitude of these separate voltages. The intersection of the two acoustic beams can thus be electrically scanned along the axis 130. The method for controlling the separate voltages to alter the focal point of an acoustic beam formed by concentric sub-electrodes is well known in the art and is described, for example in Hunt, J. W.; Arditi, M.; Foster, F. S.; *Ultrasound Transducers For Pulse-Echo Medical Imaging*, IEEE Trans. Biomed. Eng. (USA), Vol. BME-30, No. 8, pp. 453–81, 122 refs. Aug. 1983. The phase differences between the elements of each group can be programmed to dynamically focus on a desired trajectory. By this method the intersection of the beams can scan the object in the direction of transducer axis 130. The phase delays used for each group sub-electrodes must be determined such that the two focal points coincide. It is also possible to increase beam separation by increasing the gap between the two groups. This can be accomplished by deactivating one or more annular sub-electrodes between the two groups. Instead of using a single piezoelectric piece, the above annular array can be constructed using separate, annular piezoelectric sub-elements.

Figure 10:
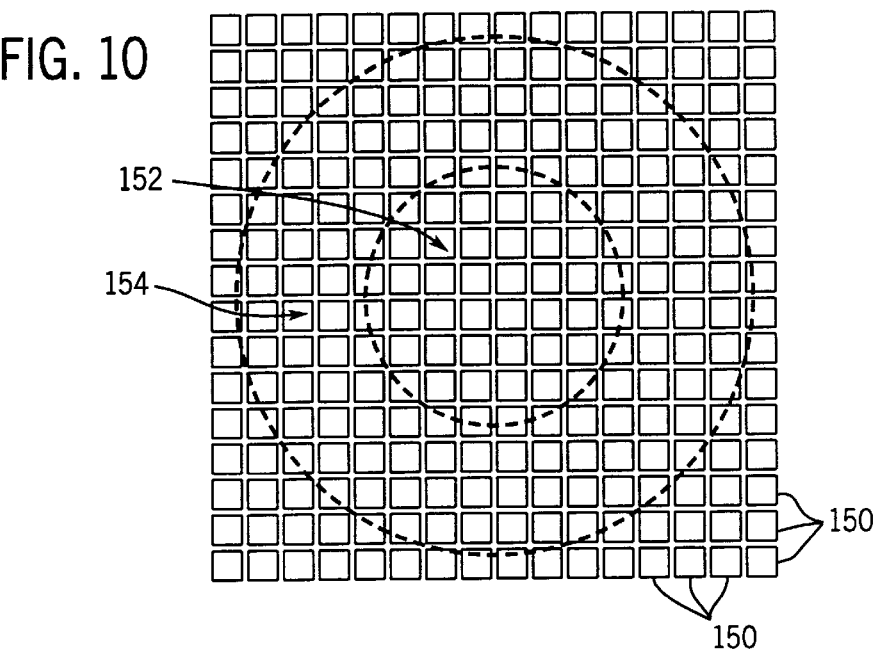
FIG. 10 is a back view of another embodiment of a transducer used to practice the present invention.

It should be apparent to those skilled in the art that the present invention can also be extended to active electrodes formed by two dimensional arrays of sub-elements. Referring to FIG. 10, a two dimensional array consisting of a rectangular grid of M by N sub-elements 150, can be used to implementation the confocal beam. In this implementation, the sub-elements are grouped to form a first element 152 which is substantially circular in shape and a second element 154 which surrounds the first element 152. The sub-elements 150 in the first element 152 are driven at one frequency ($\omega_1$) and the sub-elements 150 in the second element 154 are driven at a second frequency ($\omega_2$). The phase and amplitude of the sub-elements 150 in each group 152 and 154 are chosen to form two confocal beams that converge at the same focal point. An advantage of this method is that the phase of the sub-elements can be changed electronically at high speed, such that the resulting confocal beams of the array can scan the region of interest in one, two, or three dimensions. Construction methods for two dimensional arrays are well known to those skilled in the art, as described for example, by Turnbull, D. H.; Foster, F. S.; *Fabrication and Characterization of Transducer Elements in Two-Dimensional Arrays for Medical Ultrasound Imaging*, IEEE Trans. Ultrason. Ferroelectr. Freq. Control (USA), Vol. 39, No. 4, pp. 464–75, 22 refs. July 1992.

Figure 11:
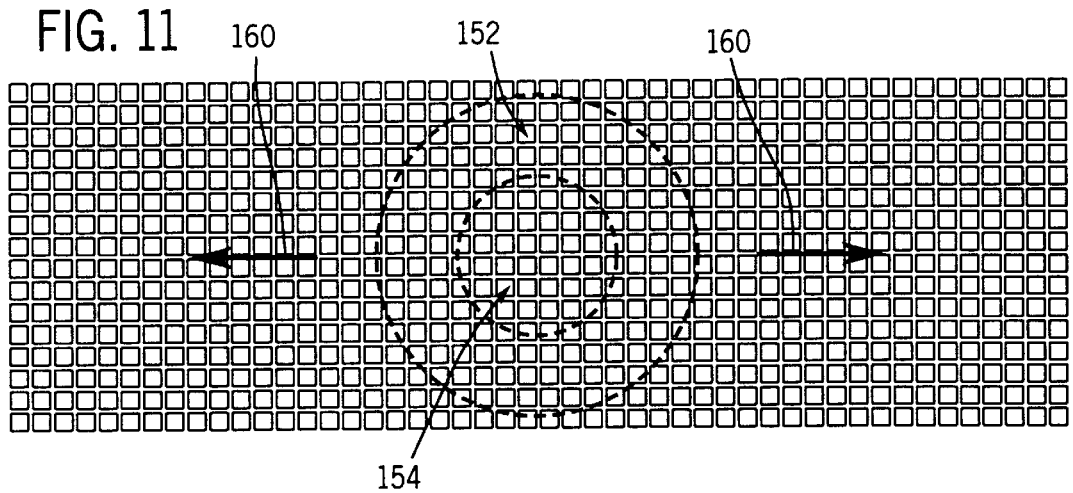
FIG. 11 is a back view of yet another embodiment of a transducer used to practice the present invention.

Another method for linear scanning of the confocal beams may be performed using the large rectangular array of sub-elements shown in FIG. 11.

As in the embodiment illustrated in FIG. 10, the sub-elements 150 are driven in two groups 152 and 154 to produce confocal beams focused at the target.

However, the sub-elements 150 can be driven such that the circular first 20 element 152 and surrounding second element 154 are moved laterally as indicated by arrows 160 to scan the common focal point from left to right.

Yet another method using the embodiment in FIG. 10 is to perform a sector scan. An example of sector scanning implemented by a two dimensional array is described by Ju, J. Y. and Greenleaf, J. F., *Steering of Limited Diffraction Beams with Two-Dimensional Array Transducer*", IEEE 1992 Ultrasonic Symposium Proceedings, IEEE Ultrasonics, Ferroelectric and Frequency Control Soc., 1992. It is also not necessary to have elements in a rectangular gird to produce confocal beams by a 2-dimensional array. An alternative element arrangement is a 2-dimensional hexagonal array, as described by Fatemi, M. And Shirani, S., *Applications of Hexagonal Arrays in Generation and Steering of Limited Diffraction Beams"*, 1994 IEEE Ultrasonics Symposium Proceedings, pp.1531–4, Vol. 3,1994.

We claim:

1. An acoustic transducer for producing a force at a target location, which comprises:

a piezoelectric element having a front surface and a back surface;

a ground electrode formed on one of the surfaces;

a first element formed on the other of said surfaces for producing a first acoustic beam that focuses at a target location; and a second element formed on the other of said surfaces for producing a second acoustic beam that focuses at the target location;

wherein each of the first and second elements are connected to respective first and second signal sources to produce two-separate acoustic beams at two different frequencies that interact at the target location to produce a force.

2. The acoustic transducer as recited in claim 1 in which the second element encircles the first element.

3. The acoustic transducer as recited in claim 1 in which said other surface is shaped to focus the acoustic beams produced by the first and second elements at the same focal point at the target location.

4. The acoustic transducer as recited in claim 3 in which the other surface is concave shaped.

5. The acoustic transducer as recited in claim 4 in which the first element is substantially circular in shape and the second element is shaped as a ring which surrounds the first element.

6. The acoustic transducer as recited in claim 1 in which the first element is formed as a first array of sub-elements and the second element is formed as a second array of sub-elements; and wherein the first array of sub-elements are driven by one set of signals at the same frequency but different phases to electronically steer the first acoustic beam to the target location and the second array of sub-elements are driven by another set of signals at another frequency but different phases to electronically steer the second acoustic beam to the target location.

7. The acoustic transducer as recited in claim 1 in which the piezoelectric element is two separate pieces, one piece supporting the first element and the other piece supporting the second element.

8. The acoustic transducer as recited in claim 7 in which the second element encircles the first element.

9. The acoustic transducer as recited in claim 7 in which the first element is substantially circular in shape and the second element is shaped as a ring which surrounds the first element.

10. The acoustic transducer as recited in claim 6 in which the piezoelectric element is formed by separate pieces that support separate sub-elements.

\* \* \* \* \*

UNITED STATES PATENT AND TRADEMARK OFFICE
CERTIFICATE OF CORRECTION

PATENT NO. : 5,991,239
DATED : November 23, 1999
INVENTOR(S) : Fatemi-Booshehri, et al.

It is certified that error appears in the above-identified patent and that said Letters Patent is hereby corrected as shown below:

<u>Column 1,</u>
Between lines 8 an 9, directly above "BACKGROUND OF THE INVENTION", please insert the following: under a separate heading of "Government License Rights"

"The U.S. Government has paid-up license in this invention and the right in limited circumstances to require the patent owner to license others on reasonable terms as provided for by the terms of CA43920 awarded by the National Institutes of Health."

Signed and Sealed this

Twenty-first Day of August, 2001

*Attest:*

*Attesting Officer*

NICHOLAS P. GODICI
*Acting Director of the United States Patent and Trademark Office*